2,827,474
PRODUCTION OF REACTIVE ORGANOSILANOLS

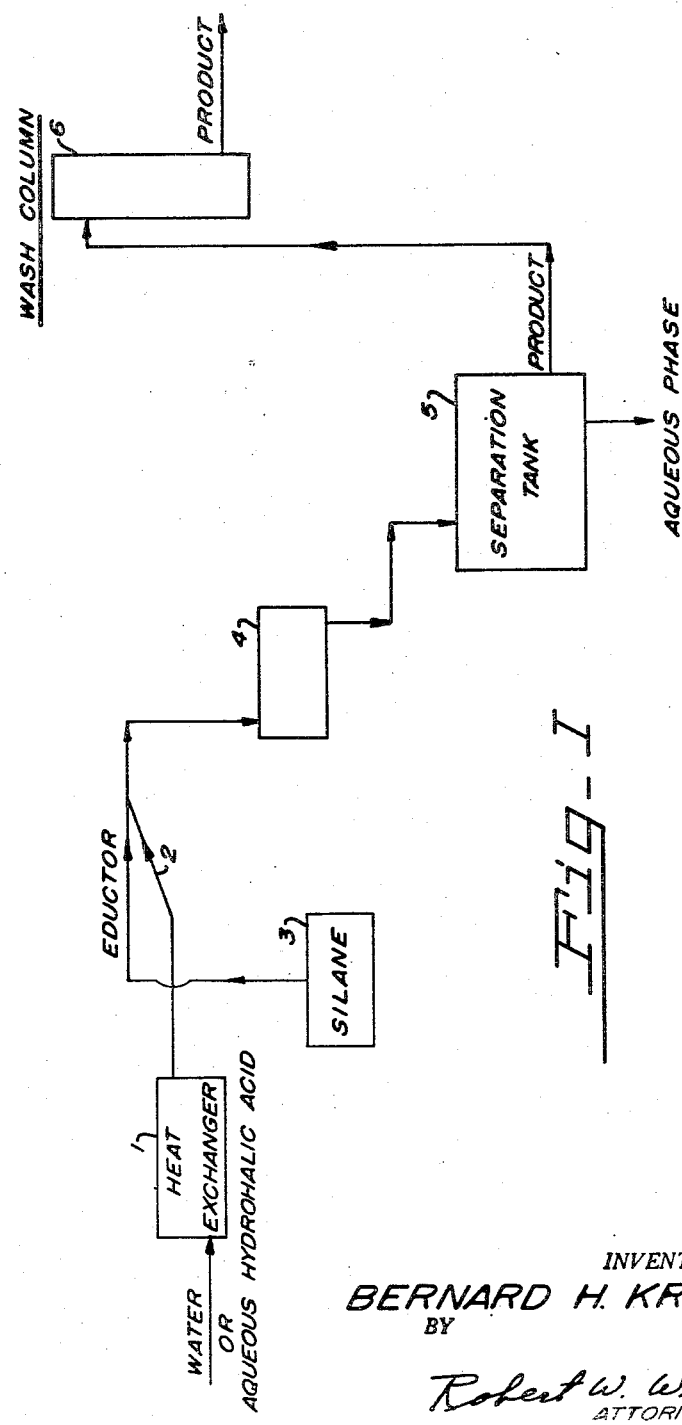

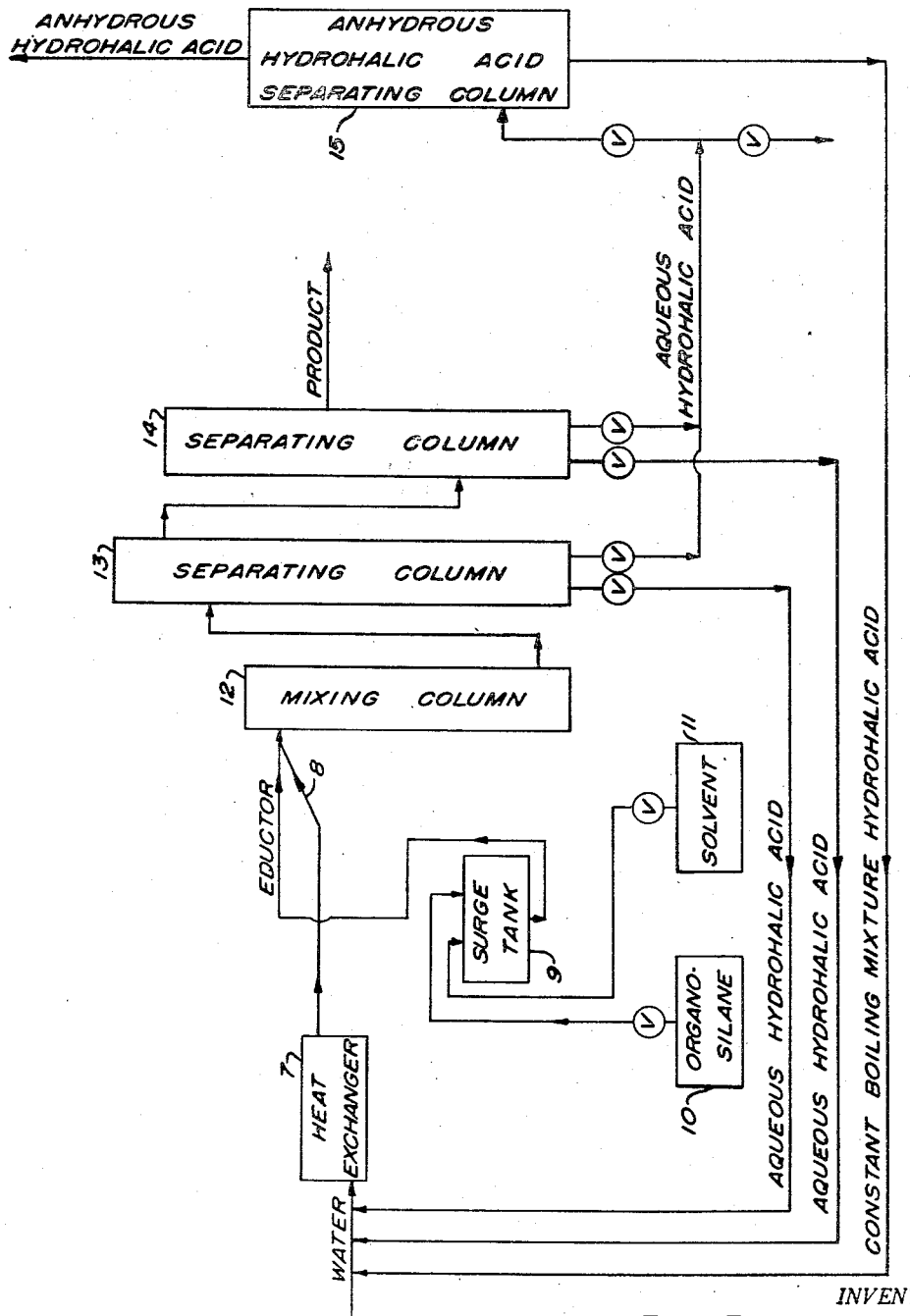

Bernard H. Kress, Toledo, Ohio, assignor, by mesne assignments, to Allied Chemical & Dye Corporation, New York, N. Y., a corporation of New York Application May 22, 1953, Serial No. 356,641

8 Claims. (Cl. 260—448.2)

The invention relates to a method of producing highly reactive organosilanols that are only slightly condensed and therefore have a high hydroxyl content and a low molecular weight.

The methods heretofore used in commercial practice for the hydrolysis of organosilanes have the disadvantage that they cause rapid condensation of the organosilanols formed by hydrolysis of the organosilanes, so that the products obtained by such methods are highly condensed organosiloxanes rather than monomeric or slightly condensed organosilanols. The highly condensed organosiloxanes produced by such methods are relatively inert substances of high molecular weight that are not sufficiently reactive for use as intermediates in the production of silicone-modified products such as silicone-alkyd resins. Such highly condensed organosiloxanes also have only limited solubility in some of the common solvents and limited compatibility with organic materials, particularly resins.

The principal object of the invention is the production of highly reactive organosilanols that are only slightly condensed and have a high hydroxyl content and a low molecular weight.

More specific objects and advantages are apparent from the following description and the accompanying drawings, which illustrate and disclose but are not intended to limit the scope of the invention.

The present invention is based upon the discovery that it is possible to produce a highly reactive, only slightly condensed acidic organosilanol by a novel method that differs from methods heretofore known in that it embodies a combination of four essential characteristics.

The first essential characteristic of the present method is that it involves the hydrolysis of a specific type of silane composition. The specific type of silane composition that must be employed in order to produce the desired highly reactive, acidic product comprises a major proportion of a mono-organo tri-functional silane (or silanes), that is, a silane whose molecule contains one hydrocarbon substituent and three hydrolyzable substituents. The composition to be hydrolyzed may contain other organosilane materials, in minor amounts, except that it must not contain any appreciable amount of mono-functional silanes, i. e., tri-organosilanes, since they are such powerful chain-stopping agents that a relatively small proportion thereof will cause the product to be completely unreactive.

In all cases, in the silane composition to be hydrolyzed, at least 70 percent of the silicon atoms must have hydrocarbon substituents attached thereto. Silane compositions in which less than 70 percent of the silicon atoms have hydrocarbon groups attached thereto hydrolyze to unstable products that gel in an unpredictable fashion either upon standing or during reaction with other materials. However, unless an average of at least 2.75 hydrolyzable substituents are attached to each silicon atom, the silane composition will hydrolyze to products of reduced reactivity, whose molecular structure and distribution of reactive hydroxyl groups is uncontrollable. It is preferred that the silane composition possess an r/Si ratio from 0.9 to 1.1, i. e., have an average of 0.9 to 1.1 hydrocarbon groups attached to each silicon atom. Best results are obtained with substantially pure tri-functional silanes, i. e. with silane compositions having an r/Si ratio of about 1.0.

A hydrogen atom attached to a silicon atom in a silane molecule is resistant to acidic hydrolysis such as that employed in the method of this invention. Such a hydrogen atom is readily removed, however, under basic conditions or by oxidation. In this respect, the use of silanes containing minor amounts of such hydrogen atoms may be advantageous in the production of hydrolysis products for textile treating, glass fiber sizing and finishing, for use in water-repellant coatings and paints, etc. The potential reactivity of the silicon-bonded hydrogen atoms may be taken advantage of in a resinous coating or film-forming composition to increase the ease and speed of cure. However, for widest applicability it is preferred to use a silane composition containing no appreciable amount of hydrogen atoms attached to silicon atoms. In any case, there must be an average of at least 2.75 hydrolyzable substituents attached to each silicon atom, and at least 70 percent of the silicon atoms must have hydrocarbon substituents attached thereto. Thus, even with the minimum permissible r/Si ratio of 0.7, there would be a minimum of 3.45 substituents per silicon atom, leaving 0.55 as the maximum number of silicon-bonded hydrogen atoms per silicon atom in a silane composition used in the practice of the invention.

The second essential characteristic of the present method is that the hydrolysis of the silane composition is conducted while the silane composition is in solution in a solvent medium that forms a two-phase system with the water used for hydrolysis. The use of a solution of the silane composition in a solvent medium that forms a two-phase system with the water used for hydrolysis is necessary in the present method because the presence of both the water and the silane composition in a single phase has been found to make it exceedingly difficult to remove the water from the resulting hydrolysis product to obtain the substantially anhydrous low molecular weight product that is desired for many applications.

The third essential characteristic of the present method is that such solvent medium comprises an aliphatic mono-carboxylic acid ester or an aliphatic ketone whose molecule contains at least five carbon atoms. These solvents are the only ones that have been found to have the necessary low degree of miscibility with water and the necessary high degree of miscibility with the silane compositions.

The fourth essential characteristic of the present method is that the hydrolysis is conducted under acidic conditions. Acidic conditions have been found to be necessary in order to obtain an organosilanol having the free hydroxyl groups that render the organosilanol highly reactive.

The distinguishing properties of the highly reactive, low molecular weight products obtained by the present method are that they have a high hydroxyl content, high solubility in a wide variety of common solvents, and great compatibility with a wide variety of resinous materials. They also have excellent stability.

Thus the present method of producing highly reactive organosilanols comprises the step of hydrolyzing, under acidic conditions, a silane composition wherein at least 70 percent of the silicon atoms have hydrocarbon substituents attached thereto, not more than two hydrocarbon groups are attached to each silicon atom, and an average of at least 2.75 hydrolyzable substituents are attached to each silicon atom, said silane composition being in solution in a solvent medium that forms a two-phase system with the water used for hydrolysis and comprises a substance whose molecule consists of hydrogen atoms, at least five carbon atoms and from one to two oxygen atoms, the carbon and hydrogen atoms being contained in two alkyl groups and a carbonyl group, and at least one of the alkyl groups being connected directly to the carbonyl group, thereby to obtain a solution, in said solvent medium, of an acidic, low molecular weight product having a high hydroxyl content.

One advantage of the present method is that it may be carried out as a continuous process.

Figure I of the accompanying drawings is a flow sheet illustrating process units and their relationship in carrying out the present method as a continuous process.

Figure II is a flow sheet illustrating a modification of the process units shown in Figure 1 and their relationship in carrying out a preferred species of the present method.

CONTINUOUS HYDROLYSIS

The process may be carried out (Figure I) by introducing a hydrolyzing medium consisting of either water or aqueous hydrohalic acid into the coils of a heat exchanger 1 under a pressure of 10–30 p. s. i. The heat exchanger 1 is cooled by circulating a temperature changing medium in a two-liter jacket surrounding coils, consisting of five turns of one-quarter inch copper or glass tubing (depending upon whether water or acid is used). The temperature changing medium can be any material (as for example salt water or a glycol-water solution, refrigerated by Dry Ice) which chill the water or aqueous acid to a point low enough so that the flow of the hydrolyzing medium and the organosilane solution can be controlled to keep the reaction temperature below 20° C. during the subsequent liquid phase hydrolysis of the organosilane solution.

The flow of the aqueous stream passing through a one-eighth inch Pyrex eductor 2 draws a metered stream of an organosilane solution from a container 3 into the system. The maximum permissible weight ratio of the organosilane stream to the aqueous stream varies with the temperature of the aqueous stream, since the colder the aqueous stream, the higher the proportion of organosilane that can be used without exceeding the maximum allowable temperature of 25° C. The weight ratio of the organosilane stream to the aqueous stream may be from 1:5 to 1:50. Preferably the ratio is from 1:25 to 1:30. The reaction temperature preferably is between 0° and 20° C., although the temperature can be lower. As soon as the organosilane solution contacts the aqueous stream a very rapid reaction begins, and the reaction continues as the reaction stream flows into a mixing chamber 4. The mixing chamber 4 either can be an agitated chamber, or can be a column (2½ feet long by ¾ inch in diameter) packed with 9/16 inch glass helices. In either case the hydrolysis reaction is completed away from the point where the fresh organosilane solution is entering the system.

The products of the reaction are allowed to separate in a tank 5, and the organosilanol product is drawn off to a wash column 6 wherein the organosilanol product is washed with a stream of water.

The product may be dried, preferably by azeotropic distillation of the water along with a portion of the solvent. The product also may be dried over such a drying agent as anhydrous calcium sulfate or anhydrous sodium sulfate. Such a drying agent is then removed (e. g., by filtration) from the dried product.

When the organosilane used is a halosilane, the process which has been described produces, as a by-product, a dilute hydrohalic acid which is of only slight value. A way of producing a more concentrated acid, as a valuable by-product, is to recycle the aqueous phase produced by the hydrolysis reaction, along with sufficient make-up water to equal the amount of water consumed in the hydrolysis reaction, to form the entering aqueous stream, until the acid concentration has been built up to the desired strength. Once the acid concentration has been built up, a fixed proportion of the aqueous phase can be constantly withdrawn from the system to remove the hydrohalic acid from the system at a rate equal to the rate at which the hydrohalic acid is formed by the hydrolysis reaction.

The rest of the aqueous phase may be recycled, along with sufficient make-up water to equal the amount of water withdrawn from the system plus the amount of water consumed in the hydrolysis reaction.

Preferably, however, the fixed proportion of the aqueous phase withdrawn from the system is pumped to an anhydrous hydrohalic acid separating column. Anhydrous acid is taken from the top of the column and the remainder of the aqueous phase (constant boiling mixture) is recycled. In this preferred method, since the only hydrohalic acid removed from the system is anhydrous acid, the only make-up water which must be added to the system is an amount equal to the amount consumed in the hydrolysis reaction.

In carrying out the process by use of the units illustrated in Figure II, water, as a hydrolyzing medium, is run into a Saran pipe leading to a heat exchanger 7 at the rate of about 1,500 pounds per hour at the start-up. The hydrolyzing medium is carried throughout the system in Saran pipes which are resistant to the hydrohalic acid. The heat exchanger 7 operates in connection with a refrigeration unit.

The flow of the hydrolyzing medium passing through a mixing eductor 8 (Schutte-Koerting—½ inch, with flanged ends) draws a metered amount of an organohalosilane solution from a surge tank 9 into the system. The surge tank can be used for mixing an organohalosilane (stored in a tank 10) and a solvent (stored in a tank 11). The ratio of the amount of the organohalosilane to the amount of the hydrolyzing medium, and all other reaction conditions, are the same as those hereinbefore mentioned in connection with Figure I. As soon as the organohalosilane contacts the hydrolyzing medium at the mixing eductor, a very rapid reaction begins, and the reaction continues as the reaction mixture flows into a mixing column 12 (Pyrex—4 inches in diameter by 8 feet long— ASME flange on each end—packed with ¾ inch rings) wherein the hydrolysis reaction goes to completion.

The products of the reaction are allowed to separate in a separating column 13, and the organosilanol product is drawn off to a second smaller separating column 14. The use of the second column eliminates the need for a washing step. The dilute hydrohalic acid produced after the start-up of the process preferably is recycled. This is continued until the acid concentration has been built up to the desired strength, after which a fixed proportion of the aqueous phase either can be removed as a valuable by-product or can be pumped to a hydrohalic acid separating column 15, as hereinbefore described. The amount of the aqueous phase to be removed can be determined by calculating the rate of formation of hydrohalic acid from the rate at which the organohalosilane enters the system, and then regulating the rate of withdrawal of hydrohalic acid so that it equals the rate of formation of the acid. Also, when the fixed proportion of the aqueous phase is removed as a by-product, the rate at which make-up water should be supplied can be calculated by adding the rate at which water is withdrawn in the by-product to the rate at which water is consumed by hydrolysis of the organohalosilane. When the fixed proportion of the aqueous phase is pumped to a hydrohalic acid separating column (wherein anhydrous acid is removed) and the residue (constant boiling mixture) is recycled, the rate at which make-up water should be supplied is the same as the rate at which water is consumed by hydrolysis of the organohalosilane.

BATCH HYDROLYSIS

The hydrolysis may be conducted as a batch method by adding the organosilane solution to the aqueous phase. The addition should be made at a rate sufficiently slow that the exothermic hydrolysis reaction does not cause local overheating. It is usually desirable, also, that the aqueous phase be stirred during the addition; otherwise, local overheating may result in spite of a slow rate of addition. In any event, the hydrolysis of the hydrolyzable groups should be carried to completion, so as to produce a "completely hydrolyzed" product.

It has been found that the hydrolysis is usually substantially complete within from about 5 to about 10 minutes after the addition of the organosilane solution to the aqueous phase has been completed. Apparently leaving the product in contact with the aqueous phase for longer periods of time has no deleterious effect on the product. In fact, it is usually desirable to continue agitation of the mixture for about 15 to 30 minutes after the addition is complete. The product layer is then allowed to separate from the aqueous phase (e. g., in a separatory funnel), and the aqueous phase may be drawn off and extracted with a water-immiscible solvent if desired. The resulting extract is combined with the product.

HYDROLYZABLE ORGANOSILANE

A hydrolyzable organosilane (one or a mixture of which is used in the method of this invention) may be any substance whose molecule consists of a silicon atom to which are attached four monovalent substituent groups, at least one of which is a hydrocarbon group attached by a carbon-silicon linkage, such as an aliphatic group, aryl group, aralkyl group, cycloaliphatic group, alkenyl group or other hydrocarbon group, and from two to three of which are hydrolyzable groups.

"Hydrolyzable group" is used herein to mean any monovalent group which is labile under the acidic hydrolysis conditions of the method of this invention. These groups may be, for example, halo, alkoxy, amino, aroxy, or acyloxy groups, and others. The halo group may consist of a fluorine, chlorine, bromine or iodine atom. The alkoxy group may be any alkoxy group, although it is preferred to employ those containing from one to four carbon atoms because of their greater ease of hydrolysis. Any amino, aroxy or acyloxy group may be employed, although it is preferred that the amino group be a simple amino group, the aroxy group be a phenoxy group and the acyloxy group be an acetyl group. Chloro- and alkoxysilanes are preferred because of their generally lower cost and ready availability, and the greater ease of recovering the volatile hydrochloric acid and alcohol hydrolysis products.

A monovalent aliphatic group attached to a silicon atom in a hydrolyzable organosilane preferably is a primary, secondary or tertiary alkyl or alkenyl group having from one to twelve carbon atoms. A monovalent cycloaliphatic group attached to a silicon atom preferably is cyclopentyl or cyclohexyl, or a mono-, di- or tri-alkyl-substituted cyclopentyl or cyclohexyl group, each alkyl substituent being a primary, secondary or tertiary alkyl group having from one to six carbon atoms, the total number of carbon atoms in the alkyl substituents being not more than six. An aryl group attached to a silicon atom preferably has from six to twelve carbon atoms and consists of from one to two benzene nuclei (e. g., is a phenyl, naphthyl or diphenyl group), having no substituents or having from one to five nuclear substituents each of which is an alkyl or alkenyl group containing not more than 6 carbon atoms. An aralkyl group attached to a silicon atom preferably has from seven to twelve carbon atoms and consists of any of the preferred aliphatic groups hereinbefore described, in which one hydrogen atom has been replaced by one of the preferred aryl groups hereinbefore described.

Examples of hydrolyzable organosilanes that can be used include methyltrifluoro- or chloro- or bromo-, dimethyldifluoro- or chloro- or bromo- or iodo-, ethyltrifluoro- or chloro- or bromo- or iodo-, diethyldichloro-, propyltrichloro-, dipropyldichloro-, butyltrichloro-, dibutyldichloro-, t-butyltrichloro-, isobutyltrichloro-, pentyltrichloro-, 3-(2,2,4-trimethylpentyl) trichloro-, lauryltrichloro-, octadecyltrichloro-, methyltriethoxy-, methyltripropoxy-, methyltributoxy-, ethyltriethoxy-, diethyldiethoxy-, ethylethoxydichloro-, ethyldiethoxychloro-, propyltriethoxy, butyltriethoxy-, butyltributoxy-, phenyltrifluoro- or chloro- or bromo- or iodo- or ethoxy-, diphenyldichloro-, diphenyldiethoxy-, phenyldichloro-, phenyldiethoxy-, phenyldiacetoxy-, benzyltrichloro-, benzyltriethoxy-, phenylbenzyldichloro-, (2,4-dimethylphenyl) trichloro-, alpha - naphthyltrichloro-, beta - naphthyltriethoxy, phenylphenoxydichloro-, phenylammoniumdiethoxy-, cyclohexyltrichloro-, cyclohexyltributoxy-, allyltrichloro-, allyltriethoxy, methallyltrichloro-, vinyltrichloro-, vinyltriethoxy-, and other silanes.

The preferred organosilane compositions for use in the present method consist of one or more phenyl, alkyl or alkenyl trifunctional silanes such as phenyl trichlorosilane, phenyl triethoxysilane, ethyltrichlorosilane, ethyltriethoxysilane, phenyl triethoxysilane, ethyltrichlorosilane, ethyltriethoxysilane, butyltrichlorosilane, t-butyltrichlorosilane, allyltrichlorosilane, allyltriethoxysilane, and particularly 1-alkenyl silanes such as vinyltrichlorosilane, vinyltriethoxysilane and others. More preferred because of the stability of resulting organosilanolas are organosilane compositions comprising at least 5% by weight of phenyl trifunctional silanes. Most preferred are compositions comprising at least 25% by weight of phenyl trifunctional silanes.

Silane compositions to be hydrolyzed by the present method may contain small amounts of tetrafunctional silanes, such as a silicon tetrahalides, e. g., silicon tetrachloride, or an alkyl orthosilicate such as ethyl orthosilicate. However, since at least 70 percent of the silicon atoms in such a composition must have hydrocarbon groups attached thereto, tetrafunctional silanes cannot constitute more than 30 mol percent of the silane composition to be hydrolyzed.

In special cases, as hereinbefore explained, it may be permissible to utilize silane compositions containing minor amounts of silanes having silicon-bonded hydrogen atoms, such as silicochloroform, methyldichlorosilane, ethyldichlorosilane, phenyldichlorosilane and others. Silicochloroform, because it contains no hydrocarbon group, cannot constitute more than 30 mol percent of the silane composition.

SOLVENT MEDIUM

In the present method of hydrolysis, the silane composition to be hydrolyzed is in solution in a solvent medium that forms a two-phase system with the water used for hydrolysis and comprises a substance whose molecule consists of hydrogen atoms, at least five carbon atoms and from one to two oxygen atoms, the carbon and hydrogen atoms being contained in two alkyl groups and a carbonyl group; and at least one of the alkyl groups being connected directly to the carbonyl group. Such a substance is an aliphatic monocarboxylic acid ester or an aliphatic ketone. The molecule of such substance preferably has not more than ten carbon atoms and must contain at least one group comprising three polyvalent atoms, connected to the carbonyl group, as in methylpropyl ketone or ethyl propionate (as distinguished from diethyl ketone).

The ketones that may be used include methyl propyl ketone, methyl isopropyl ketone, methyl butyl ketone, methyl isobutyl ketone, methyl amyl ketone, dipropyl ketone, diisopropyl ketone, ethyl propyl ketone, ethyl isopropyl ketone, ethyl butyl ketone and ethyl isobutyl ketone. The preferred ketone solvents are methyl isobutyl ketone and methyl amyl ketone.

The solvents that may be used also include that class of esters which may be considered to be derived by esterification of an aliphatic monohydric alcohol having from 2 to 8 carbon atoms with an aliphatic monocarboxylic acid whose molecule consists of a primary or secondary alkyl radical, having from one to three carbon atoms, whose free valence is connected to a carboxyl group (i. e., acetic acid, propionic acid, isobutyric acid and butyric acid), the total number of carbon atoms in the ester molecule being at least five and not greater than 10. Non-reactive substituents, such as halogen atoms having an atomic weight less than 80, may be present in an aliphatic radical in either the acid or the alcohol.

Such aliphatic monocarboxylic acid esters include: n-propyl acetate, isopropyl acetate, n-butyl acetate, isobutyl acetate, secondary butyl acetate, tertiary butyl acetate, n-amyl acetate, isoamyl acetate, secondary amyl acetates, tertiary amyl acetate, n-hexyl acetate, isohexyl acetate, n-heptyl acetate, 2-ethylhexyl acetate, capryl acetate, ethyl propionate, isopropyl propionate, n-butyl propionate, secondary butyl propionate, isobutyl propionate, n-amyl propionate, isoamyl propionate, ethyl butyrate, n-propyl butyrate, n-butyl butyrate, isobutyl butyrate, n-amyl butyrate, isoamyl butyrate, isobutyl isobutyrate and isoamyl isobutyrate.

The most desirable solvents are isopropyl acetate and n-butyl acetate.

When solvents of this type are diluted with other solvents such as xylene to form the solvent medium, at least one-fourth and preferably one-third of the solvent medium should consist of a solvent or solvents of the former type.

The phrase "forms a two-phase system with the water used for hydrolysis" is used herein to mean that the solvent medium is substantially immiscible with water, in the proportions employed, i. e., that not more than approximately 5 percent and preferably considerably less than 5 percent of the solvent medium dissolves in the water used for hydrolysis. The term "percent" or "parts" as used herein means percent or parts by weight, unless otherwise specified.

Preferably the solvents used have a boiling point below 200° C. (at atmospheric pressure) so that they can be readily removed from the final product and replaced with a less expensive solvent, if desired.

It is usually desirable to use a substantial amount of the solvent medium (e. g., from about 100 to about 300 ml. of solvents per gram mol of silanes). In some instances (e. g., when the silanes are hydrolyzable only with comparative difficulty) it is desirable to use considerably less solvent, while in still other instances (e. g., when the silanes are particularly easy to hydrolyze) it is desirable to use somewhat more solvent.

AQUEOUS PHASE

The initial composition of the aqueous phase in the present method may be different for different organosilanes. For the hydrolysis of halosilanes, the entering aqueous phase may consist of water alone. For the hydrolysis of amino, acyloxy or aroxysilanes, which are more difficult to hydrolyze, the entering aqueous phase should consist of a dilute solution of a mineral acid such as hydrochloric, sulfuric or phosphoric acid. Alkoxy groups are still more difficult to hydrolyze, and require the use of higher temperatures, greater concentrations of mineral acids and reduced amounts of solvents, to accelerate the hydrolysis reaction.

In order to produce complete hydrolysis, it is desirable to use an aqueous phase containing at least 5 and preferably 10 gram mols of water for every two gram atoms of hydrolyzable groups in the organosilanes entering the system, i. e., 5 to 10 times the amount of water theoretically required to hydrolyze the organosilanes.

In all cases the hydrolysis is carried out under acidic conditions (at a pH below 7.0) to produce an acidic organosilanol.

Properties of products

The organosilanols produced by the method of this invention are possessed of an unusually high degree of reactivity for various hydroxyl-containing materials. By the term "hydroxyl-containing materials" is meant materials which contain alcoholic hydroxyls, as distinguished from the (OH) groups attached to the carbonyl carbon atoms of carboxyl groups. While it has been claimed that known silicones or siloxanes would react with hydroxyl-containing materials such as glycerol, cellulosics, alkyd resins, etc., the reaction obtained, if any, is the result of the application of strong catalysts such as peroxides, oxygen, etc. and/or high temperatures, pressures, etc., whereby the hydrocarbon groups attached to the silicon atoms are attacked so as to provide reactivity with the hydroxylated materials. For example, there are many references in the patents and literature to the use of mixed solutions, or even reaction products, of various silicones with hydroxyl-containing resins such as cellulosics, alkyds, urea resins, etc., and the production of insoluble films and coatings therefrom. Baking or cure of these products, however, requires exposure to extremely high temperatures of above 400 to 450° F. for extremely long periods of time. This type of cure appears to depend on partial decomposition of the silicone ingredient. As a result, the cured products are not as valuable as they might be. Because of the extremely rigorous cure cycles they require, these so-called "siliconated" materials have found only limited acceptance in specialty applications where more conventional materials fail completely.

It has been disclosed also that freshly-prepared hydrolyzates of organosilanes are unstable and highly undesirable. For example, United States Patents Nos. 2,258,218 and 2,258,220 disclose the necessity of dehydrating the hydrolyzates of, respectively, methyl and ethyl silanes. Further, Patent No. 2,482,276 discloses a process of stabilizing organosilane hydrolysis products against gelation, by refluxing in the presence of alkali.

It is surprising and highly unexpected, therefore, that organosilanols prepared in accordance with the present method by hydrolysis of trifunctional (mono-organo) silanes should be stable upon storage and react smoothly, without gelation, with other reactive materials. The term "stable," as applied to such organosilanols, means that they do not gel by self-condensation, and retain their ability to react, as described, for a time sufficient to make them useful as chemical entities.

The organosilanols made by the method of this invention react readily with a wide variety of hydroxyl-containing materials. The resulting resinous reaction products cure at temperatures below 400° F. In fact, silicone-alkyd, made from the highly reactive, acidic organosilanes described in the examples cure in 10 to 90 minutes or less at temperatures of 150 to 375° F. for baking types and, when suitably oil-modified, are air-drying. Similarly, other products made from the organosilanols cure at room temperature, or in a matter of minutes at 100 to 350° F.

These highly-reactive organosilanols also have vastly different solubilities (in common solvents) and compatibilities with other resinous materials than the completely condensed silicones. For example, many of the latter are insoluble in ethanol, and sparingly soluble in aliphatic hydrocarbons (mineral spirits), and in many common varnish, lacquer and paint thinners, etc., and are incompatible with many common resinous materials such as alkyd resins, ester gums, cellulose lacquers, etc. In contrast, the stable, highly-reactive organosilanols made by the method of the invention are soluble in alcohols, esters, ketones, and other polar solvents, completely miscible with aromatic solvents, more tolerant of aliphatic solvents, and compatible in wide proportions with alkyd resins, urea and melamine coating resins, cellulosics, varnish resins and gums, lacquer resins, etc.

The reasons for the reactivity, cure rate solubility and compatibility of these organosilanols are believed to be (1) the low molecular weight and (2) the high hydroxyl content of the organosilanols as compared to completely condensed silicones. In general, the lower the molecular weight of the organosilanol the more soluble, reactive and compatible it will be. Likewise, the higher the hydroxyl content of the organosilanol the greater its reactivity, solubility and compatibility with polar resinous materials. However, the hydroxyl content of an organosilanol is much more critical with regard to reactivity than its molecular weight. It is possible, for example, to produce low molecular weight silicones or siloxanes which contain no measurable hydroxyl content and which are found to be completely unreactive and of greatly reduced solubility and compatibility. It is only when both the molecular weight is low and the hydroxyl content is high that an organosilanol is truly reactive, soluble and compatible as described.

The value of stable, acidic and highly-reactive organosilanols can be readily appreciated. They are admirably adapted for the modification or fortification of many organic substances, especially resins. Their greater solubility and compatibility with solvents and resins permits greater latitude in formulating siliconated compositions. More important, their greater solubility and compatibility permits the incorporation of sufficient silicone content to obtain significant improvement of properties. They can be used, for example, to introduce into a resin a higher proportion of the exceedingly stable silicon-oxygen-silicon (Si—O—Si) linkages than could be introduced by reacting the resin with a hydrolyzable organosilane or by incorporating such organosilane during the production of the resin itself.

Unexpectedly, a trifunctional silane (i. e. a mono-organosilane whose molecule contains three hydrolyzable groups) or a mixture high in such silanes and low in difunctional silanes can be hydrolyzed by the method of this invention to produce a highly reactive hydroxyl-containing hydrolyzate or organosilanol which is sufficiently stable either in acidic organic solvent solution, or as a solvent-soluble solid or semi-solid, to retain its acidic reactivity towards hydroxylated materials for a period of a year or more.

In a pure state, the organosilanols obtained by the present method are naturally acidic and are stable as long as they are kept out of contact with alkali or strong acid. It is for this reason that the hydrolysis method of the invention utilizes only clear water washes or mechanical separation to rid the organosilanol solution of byproducts of hydrolysis such as HCl, or utilizes distillation to free the organosilanol solution of alcohols, phenols, amines, etc. The organosilanols are extremely sensitive to caustic or alkali in any form. For example, washing with a weak sodium carbonate solution reduces the hydroxyl content and frequently effects a marked reduction in the molecular weight. An alcoholic organosilanol solution will react with alkali, and on subsequent standing, will liberate all bound alkali, with the silicone ingredient precipitating as a completely unreactive, hydroxyl-free white solid of the same or lower molecular weight. Likewise, standing in contact with strong mineral and organic acids, especially the former, converts the organosilanols to unreactive silicones having little or no hydroxyl content. However, in the absence of alkalis and strong acids, the organosilanols show only a slow increase in molecular weight and very little change in hydroxyl content or reactivity during storage for 6 to 12 months or more. Ordinary variations in temperature during storage do not appear to cause condensation, precipitation, or change in viscosity or solubility.

The weight percent of hydroxyl, in and of itself, is not a precise measure of the reactivity of an organosilanol, because the size of the hydrocarbon groups determines the percent of hydroxyl in an organosilanol having a given number of hydroxyl groups per silicon atom. The hydroxyl content expressed as the hydroxyl/silicon ratio (H), i. e. the average number of hydroxyl groups per silicon atom in an organosilanol, is a more precise manner of characterizing an organosilanol. It has been found that organosilanols having (H) values as low as 0.10 and as high as 1.05 are possessed of superior reactivity, stability, solubility, and compatibility, and produce siliconated products that are readily cured. Those having (H) values ranging from 0.15 to 0.65 are preferred because of their better balance of stability and reactivity. Most preferred are those organosilanols having an (H) value from 0.30 to 0.65. The hydroxyl content of organosilanols is most accurately determined by the so-called Zeriwitinoff method in which a Grignard reagent such as methyl magnesium iodide dissolved in dibutyl ether reacts with the organosilanol, with the liberation of methane. Measurement of the amount of methane liberated is a direct measure of the hydroxyl content of the organosilanol. An alternative, but less reliable, method for hydroxyl determination is the Karl Fischer method utilizing a sulphur dioxide-pyridine-iodine reagent, which involves reduction of iodine to the hydrogen iodide endpoint.

The organosilanols prepared by the present method from phenyl trichlorosilane, for example, may vary in hydroxyl content from as little as 1.5% by weight to as much as 12.5%. Materials within this range are readily reacted with hydroxyl-containing substances such as polyhydric alcohol-polycarboxylic acid polyesters (alkyds). Siliconated products made from materials at the lower end of this range are not as flexible or as readily cured as those made from materials at the middle or upper end of the range. Also, phenylsilanols containing 10 to 12% or more of hydroxyl are not as stable as those lower in hydroxyl content. It is preferred, therefore, that phenylsilanols contain from 3 to 9% hydroxyl. Better still, for ease of handling and ready reactivity with hydroxyl-containing materials, it is preferred that phenylsilanols contain from 4 to 8% hydroxyl.

The organosilanols also are preferably below 5000 in molecular weight. It is difficult to produce an organosilanol having a molecular weight above 5000, and still having the preferred hydroxyl content, from a trifunctional organosilane. When below this molecular weight an organosilanol is soluble and compatible with most hydroxyl-containing materials. It is preferred that an organosilanol for reaction with alkyd resins have a molecular weight below 3000. The most preferred organosilanols have molecular weights between 1200 and 3000, as determined by the cryoscopic or freezing point depression method (in benzene).

The invention will now be more fully described with reference to specific examples showing the hydrolysis of various organosilanes and organosilane mixtures and the utilization of the resulting organosilanols in the preparation of various siliconated resinous products.

The "acid number" of an organosilanol, as used herein, means the number of milligrams of potassium hydroxide (in 0.1 normal alcohol solution) required per gram of organosilanol (on a completely condensed basis) to neutralize a xylene solution of the organosilanol in a rapid titration to the first permanent pink end point with phenolphthalein. (Because of the use of an organic solvent, such an acid number gives an indication rather than an absolute determination of acidity.)

The weight of organosilanol (on a completely condensed basis) in a solution can be determined by pouring a sample of the solution on a glass plate and baking the plate until the film is completely cured. The weight of the completely cured film is then the weight, on a completely condensed basis, of the organosilanol in the sample of the solution. This method of determining total solids content is used for the organosilanol solutions in the following examples, while the solids content of other solutions is expressed as true percent by weight, unless otherwise indicated.

Example 1

The following example illustrates the production of an alkylsilanol and an arylsilanol by the present method:

(a) Ethyltrichlorosilane (1000 grams) is mixed with butyl acetate (1000 ml.). The resulting solution is added dropwise with stirring to water (5000 ml.) which is cooled by means of glass coils through which is pumped a mixture of ethylene glycol and water that has been cooled by Dry Ice. The reaction temperature is controlled by the rate of addition of the chlorosilane solution and is kept at 0–10° C. After complete addition of the chlorosilane solution, agitation is continued for 15 to 30 minutes without further cooling. The reaction mixture is then permitted to separate into two layers (in a separatory funnel). The water layer is withdrawn and the butyl acetate layer is washed with water (two portions of 1000 ml. each) containing 0.05 weight percent of a commercial demulsifier ("Span 20"). The mixture of the butyl acetate layer and the wash water is agitated vigorously and then the wash layer is separated in a separatory funnel. The washed butyl acetate layer is dried overnight over anhydrous calcium sulfate or anhydrous magnesium sulfate and filtered. The resulting ethylsilanol solution contains 36 percent solids.

(b) A phenylsilanol solution is prepared by the procedure of (a), using phenyltrichlorosilane (1000 grams) instead of the ethyltrichlorosilane. The final phenylsilanol solution contains 41 percent solids.

The use of butyl acetate as a hydrolysis solvent in these procedures results in the production of stable organosilanol solutions, the phenylsilanol solution being more stable than the ethylsilanol solution. (This is possibly a function of the molecular weight and/or hydroxyl content.) These solutions have been reacted successfully with short, medium, and long oil alkyd resins. The phenylsilanol solution is compatible with certain types of polyester, ethyl cellulose, poylvinyl acetate and polyvinyl butyral resins without need for chemical reaction. The ethylsilanol solution has been reacted successfully with alkyd resins after two months of storage and the phenylsilanol solution has been reacted successfully with alkyd resins after nine months of storage.

Example 2

The following example illustrates the use of other solvents in the present method:

(a) Ethyltrichlorosilane (100 grams) and cyclohexyltrichlorosilane (100 grams) are mixed with a volatile organic solvent (280 ml. of methyl amyl ketone). The resulting solution is added dropwise to a stirred slurry of cracked ice and water (about 250 grams of water and about 250 grams of ice). The hydrolysis mixture is maintained between 15 and 30° C. during the addition of the organosilane solution, which is complete in about 30 minutes. The ketone layer is then separated from the water layer (in a separatory funnel); the water layer is extracted with methyl amyl ketone (150 ml.) and the ketone extract is added to the original ketone layer. The combined ketone solution is washed with water (150 ml.). The ketone solution of the hydrolysis products is mixed with an alkyd resin (186 grams of a short oil length coconut oil-modified glycerol phthalate alkyd resin, diluted to 60 weight percent solids with xylene prepared by the following procedure: a mixture of glycerol (6.38 mols), coconut fatty acids (2.92 mols) and phthalic anhydride (5.40 mols) is heated in an inert atmosphere at a temperature between 200° C. and 250° C. until an acid number of 2.2 is reached). The mixture is placed in a three-liter, three-necked flask fitted with a stirrer and a Stark and Dean trap equipped with a reflux condenser. The stirred liquid is heated and maintained in gentle reflux to remove water and a mixture of methyl amyl ketone and xylene through the Dean-Stark trap. Additional xylene (135 ml.) is added during the refluxing. The refluxing is continued for a total time of three hours to obtain a silicone-alkyd resin having a solids content of 64.5 percent, a viscosity of H (Gardner-Holdt), and a color of 12 (Gardner-Holdt). A film of the finished resin cured at 350° F. for one hour is clear and has a Sward hardness of 60.

(b) The procedure described in (a) is repeated, except that the volatile organic solvent used is methyl isobutyl ketone, and the refluxing of the mixture of the ketone solution of the hydrolysis products and the alkyd resin is continued for a total time of three and one-half hours. The resulting silicone-alkyd resin has a solids content of 69.6 percent, viscosity X—Y, color 5 (Gardner-Holdt). A film of the finished resin is clear and has a Sward hardness of 50.

(c) Ethyltrichlorosilane (105 grams) and cyclohexyltrichlorosilane (105 grams) are mixed with a volatile organic solvent (210 ml. of isopropyl acetate). The resulting solution is added dropwise with stirring to water (500 ml.). The hydrolysis mixture is maintained at 0 to 10 degrees C. during the addition, which requires about 40 minutes. When the organosilane addition is complete, agitation of the mixture is continued for about five minutes without further cooling. The mixture is then separated into two layers (in a separatory funnel). The water layer is withdrawn and the isopropyl acetate layer is washed with water (150 ml.). The washed solution is then mixed with an alkyd resin (195 grams of the coconut-modified alkyd resin described in (a) and with xylene (200 ml.), and the mixture is refluxed for two and one-half hours, using the apparatus described in (a). The resulting silicone-alkyd resin has a solids content of 72 percent, viscosity $Z_2$—$Z_3$, color 2 (Gardner-Holdt).

Example 3

The following example illustrates the reactivity of organosilanols produced by the present method with various hydroxyl-containing materials:

(a) A solution of 44.2 lbs. of phenyltrichlorosilane in 39 lbs. of butyl acetate is run into a vessel containing 165 lbs. of water, over a period of three and one-half hours, while maintaining the temperature in the vessel between 5° and 10° C. The aqueous phase is vigorously agitated throughout the addition of the organosilane solution. The contents of the vessel then are allowed to stand to effect separation into layers. The lower aqueous acid layer is drawn off, and the organosilanol solution layer is washed twice with clear water. The solution is then dried over a drying agent or azeotropically refluxed to produce a clear, anhydrous, water-white organosilanol solution.. Upon analysis the organosilanol solution is found to contain about 45% solids. The organosilanol is found to have a molecular weight of 1400–1550 by the cryoscopic method in benzene. After the solution stands for several months the molecular weight is 1630, the percent (OH) is 6.1, the percent silicon is 21, and the (H) value (OH/Si) is 0.48.

As a control, the foregoing procedure is repeated, ecept that xylene is used as the solvent instead of butyl acetate. The resulting organosilanol is found to have a molecular weight of 3500 by the cryoscopic method in benzene. Organosilanols having such comparatively high molecular weights are not compatible with all types of alkyd resins, as are the organosilanols produced by the method using the solvents illustrated in Examples 1 and 2 and in the examples which follow. Thus, the disadvantage of the use of xylene is that it produces organosilanol solutions which are restricted as to their end uses.

The 45 percent butyl acetate solution of a phenylsilanol, prepared as described in the first paragraph of this example, is mixed with 20 percent of it weight of diethylene glycol, and the resulting compatible mixed solution is refluxed for 24 hours under a water-trap. From 5 to 6 percent of water, based on the original weight of organosilanol solution, is collected in the trap. The solution is then cooled slightly and filtered through Filter-Cel while hot.

Enamels are made by ball mill grinds with rutile titanium dioxide pigment. The vehicle is a 70/30 blend of the foregoing organosilanol-glycol condensation product and a butylated urea coating resin. The pigment/vehicle ratio is 47.5/52.5. The resulting enamel or pigmented lacquer is cut to spraying viscosity with a suitable solvent and then sprayed on 24 gauge bonderized cold rolled steel panels. The coated panels are then baked for 30 minutes at 400° F. The resulting coating is smooth and has a Sward hardness of 36. Another enamel prepared in the same manner, except that the urea resin is omitted and the thinner utilized is butyl ether of the ethylene glycol, forms a smooth uniform coating having a Sward hardness of 38 and having good impact and flexural properties, which is resistant to soap solution (1½% Gold Dust solution at 160° F. for 19 hours).

(b) A phenylsilanol prepared by a batch hydrolysis procedure similar to that of (a), utilizing butyl acetate and a technical grade of phenyltrichlorosilane, is found to have a very low molecular weight and a high hydroxyl content. After storage for 4 weeks, the molecular weight is found to be 1375. After storage for 11 weeks, the molecular weight has increased only to 1710 and the percent hydroxyl is 6.75. The (H) value of this 11 week old solution is 0.54 and the percent silicon is 21.

The foregoing phenylsilanol (b) is utilized in making an organosilanol-glycol condensate by a procedure similar to that of (a), except that after the initial 24 hour reflux the excess diethylene glycol is washed out with water. The washed butyl acetate solution is then transferred to a three-neck flask equipped with a thermometer, water-trap, a reflux condenser and stirrer. An amount of 2-ethylhexyl acetate equal to 85 to 90 percent of the original organosilanol solution is added, and refluxing is continued to remove any water remaining from the washing step. Refluxing is then continued while drawing off an amount of butyl acetate equivalent to the amount of 2-ethylhexyl acetate added. The reflux temperature is increased in this manner from 125–130° C. to 197–200° C. Refluxing is continued, at the higher temperature with return of condensed solvent, until the desired viscosity is reached. A viscosity of Q (Gardner-Holdt) is reached in 40 minutes of reflux and a viscosity of U in 60 minutes. A small amount of additional water corresponding to 0.4 to 0.5 percent by weight of the original organosilanol solution collects in the trap during this period. The reaction mixture is then cooled rapidly to 100–150° C. and filtered through a varnish filter, if necessary, while still hot. The product is a clear, water-white solution.

(c) An organosilanol similar to that utilized in (b), prepared by batch hydrolysis in butyl acetate of a mixture of equal parts by weight of phenyltrichlorosilane and ethyltrichlorosilane, and having an (H) value of about 0.50, is utilized in a cellulose acetate butyrate lacquer formulation. The cellulose acetate butyrate is of the lacquer type known as Tennessee Eastman EAB 381–20 having an acetate content of about 44 percent, a butyryl content of about 38 percent and about 1.5 hydroxyls per 4 anhydroglucose units. First, a 9 percent solution of the cellulose acetate butyrate in xylene is prepared as a control. Second, a mixture of equal parts, on the solids basis, of the cellulose acetate butyrate and organosilanol solutions is prepared containing 16½ percent total solids. The resulting solution is clear and evidences complete compatibility. Previously known silicone products are known to have very limited compatibility with cellulose acetate butyrate resins.

The resulting clear lacquer-like solutions are ball mill ground with rutile titanium dioxide so as to have a pigment/vehicle ratio of 47.5/52.5. The resulting pigmented lacquers are sprayed on 24 gauge bonderized cold rolled steel panels and baked for 30 minutes at 400° F. Gloss readings are taken, and the panels then are baked 5 hours longer at 400° F. (The gloss readings are taken with a Gardner gloss meter in which the gloss is read at an angle of 60°, using a scale based on a maximum gloss of 96 for black glass.) The properties of the resulting coatings are as follows:

| | C. A. B. Control | C. A. B.—Si |
|---|---|---|
| Gloss after 30 min. bake | 49 | 64. |
| Gloss after 5½ hr. bake | 58 | 60. |
| Sward hardness | 28 | 36. |
| Solvent resistance | lacquer solvents—poor. | xylene—OK; lacquer solvents—OK. |
| Soap resist. (1½% soln. Gold Dust at 160° F.). | 144 hrs. failed | 168 hrs. OK. |
| Weatherometer resistance | 300 hours | 1,000 hours. |

The above table shows that the cellulose acetate butyrate organosilanol blend bakes to an insoluble lacquer film, whereas the cellulose acetate butyrate film remains susceptible to solvent attack. Further, the greatly improved soap and Weatherometer resistance values are indicative of a high degree of interaction between the cellulosic derivative and the organosilanol on baking.

(d) The same phenyl-ethyl co-hydrolyzed organosilanol solution in butyl acetate as utilized in (c) is blended first on an equal solids basis and then on a 1:3 solids basis with a butyl acetate solution of polyvinyl butyral known as "Bakelite XYHL," said to contain 7% (OH), and having an intrinsic viscosity of 0.81 (compared to cyclohexanone at 20° C.). The final solutions are diluted to 15 percent solids content with butyl acetate, poured on bonderized 24 gauge cold rolled steel plates and allowed to drain before baking 30 minutes at 400° F. The organosilanol/polyvinyl butyral baked films are greatly superior to films of the polyvinyl butyral alone in resistance to soap, boiling water and weatherometer meter exposure. The organosilanol/polyvinyl butyral films also are of greatly reduced solubility. Films baked only 15 minutes at 300 to 400° F. are similar to those baked for 30 minutes. Other silicone materials either are incompatible with polyvinyl butyral in solution or baked coatings of the mixed solution form cloudy films of very poor properties.

(e) A solution of ethyltrichlorosilane (160 grams) and phenyltrichlorosilane (160 grams) in butyl acetate (320 ml.) is hydrolyzed in water (1750 ml.), using the apparatus and procedure described in Example 1 (a), except that the two portions of wash water contain 350 ml. each instead of 1000 ml. each. The washed butyl acetate layer is mixed with a soya-modified alkyd resin, prepared by the following procedure: Alkali refined soya oil (1130 grams) technical pentaerythritol (225 grams), and a 5 percent solution of calcium naphthenate (4.5 grams) are heated in a flask fitted with a condenser and an inlet tube through which a moderate stream of carbon dioxide is passed over the surface of the reaction mixture, for one hour at a temperature of 235 degrees C. The solution is then cooled and phthalic anhydride (434 grams) and maleic anhydride (9 grams) are added. The resulting mixture is heated for six hours at a temperature of 235 degrees C. and then is cooled. "Varnolene" (mineral spirits) is added to 420 grams of the resulting resin to dilute the resin to a 70 percent solids concentration. The acid number of the resulting solution is 4, the color 5 (Gardner-Holdt) and the viscosity $Z_1$ (Gardner-Holdt). The mixture of the butyl acetate solution of the hydrolysis products and 420 grams of the alkyd resin (diluted with mineral spirits) is placed in a flask equipped with a Dean-Stark trap, and the solution is maintained in gentle reflux for about 2 hours, until a sample of the resin solution forms a clear film on a glass plate upon baking for 5 minutes at 350 degrees C. "Varnolene" is then added to dilute the product to 60 percent solids. The resulting silicone-modified alkyd solution has a color of 5 (Gardner-Holdt), a viscosity of T (Gardner-Holdt) and an acid number of 3.3 (based on resin solids). If the product is diluted only to 80 percent instead of 60 percent solids, the resulting semisolid resin has a color of 7 (Gardner-Holdt), and an acid number of 5.5 (based on resin solids). This semisolid resin is useful for application to textiles.

A 100 gram sample of the product having a concentration of 60 percent solids is ground with 60 grams of rutile (Du Pont R110), a naphthenate drier solution (containing 0.6 gram of lead and 0.08 gram of cobalt) and 40 grams of Varnolene. The resulting air-drying enamel, when sprayed on a steel panel, is "set to touch" in 1 hour and is "dry" in 3½ hours. The panel then is exposed outdoors in southern Florida. The initial gloss of the panel is 91. After sixteen months of weathering, the gloss of the panel has not yet decreased to a value of 30 (taken with a Gardner gloss meter).

*Example 4*

The following example illustrates procedure for isolating organosilanols produced by the present method.

(a) V. M. & P. naphtha (2 to 3 volumes) is added to a small sample of a 40 percent solution of a phenylsilanol in butyl acetate. A voluminous sticky coagulum forms immediately and is caught up on a stirring rod and worked in contact with the mixture until the coagulum turns into a white grainy ball. The mixed butyl acetate-naphtha solvent is decanted and another portion of naphtha is added with continuous working. The solid coagulum gets less and less sticky, and after several efficient extractions with naphtha the coagulum ball disintegrates. A powdery organosilanol is obtained by filtration. The ball may be removed before disintegration, air dried, and powdered as fine as desired. The resultant dried powder can be redissolved in xylene or butyl acetate for reaction with an alkyd resin.

(b) An ethyl-phenyl cohydrolyzed silanol is separated from a butyl acetate solvent by the procedure of (a). This organosilanol, however, comes down as a dispersion or a very sticky semi-liquid much like a grease. On standing, a heavy oil collects on the bottom of the container which is 100 percent reactive organosilanol. An ethyl-phenyl silanol is separated in a similar manner from a solvent containing 40% butyl acetate and 60% xylene, by the same procedure.

Other precipitating solvents that may be used instead of V. M. & P. naphtha are petroleum ethers, and isoparaffins of the type used for odorless solvents. The latter solvents are excellent for precipitating phenylsilanols or ethyl-phenyl silanols because they are low in aromatics. Mineral spirits can be used to precipitate a phenylsilanol but not an ethyl-phenyl silanol. Other methods of isolating reactive organosilanols are vacuum distillation at low temperatures and spray drying. Organosilanol solutions can be concentrated to nearly 80 percent solids by ordinary evaporation techniques.

*Example 5*

Phenyltrichlorosilane (250 grams) and ethyltrichlorosilane (250 grams) are mixed with an organic solvent (500 cc. of butyl acetate) and placed in a container (see Figure I). The organosilane solution is continuously drawn, as a stream, into an agitated chamber by the action of a stream of water passing through an eductor, at a ratio of 1 part of organosilane solution to 50 parts of water, until the contents of the organosilane container is exhausted (over a period of 30 minutes). The water is pumped into the system under a pressure of 10 p. s. i., and is chilled by flowing through a heat exchanger before passing through the eductor, to give an inlet temperature (entering the eductor) of 3–10° C. and an outlet temperature (leaving the eductor) of 4–10° C. The contact of the silane-solvent solution with the chilled water produces an immediate hydrolysis reaction, which goes to completion in the agitated chamber at a temperature of 4–10° C. The aqueous phase (dilute hydrochloric acid) then is allowed to separate in a separation tank. The hydrochloric acid (55 pounds having an HCl concentration of 1.2 percent) flows from the bottom of the tank, and the phenyl-ethyl silanol solution is drawn from the top of the tank to a washing column where it is washed with water. This product is tested by reacting it with a coconut oil-modified alkyd resin prepared by the following procedure: coconut oil (880 grams), glycerol (264 grams) and a 5 percent solution of calcium naphthenate (3.4 grams) are heated in a flask fitted with a condenser and an inlet tube through which a moderate stream of carbon dioxide is passed over the surface of the reaction mixture, for one hour at a temperature of 230 degrees C. The solution is then cooled and phthalic anhydride (1100 grams), glycerol (420 grams), and maleic anhydride (28 grams) are added. The resulting mixture is heated for six hours at a temperature of 220 degrees C. and then is cooled. Xylene is added to 630 grams of the resulting resin to dilute the resin to a 60 percent solids concentration. The acid number of the resulting solution is 3, the color 2 (Gardner-Holdt) and the viscosity $Z_4$ (Gardner-Holdt). The mixture of the butyl acetate solution of the hydrolysis products and the 630 grams of alkyd resin (diluted with xylene) is placed in a flask equipped with a Dean-Stark trap, and butyl acetate is distilled while the solution is maintained in gentle reflux for about 2 hours, until a sample of the resin solution forms a clear film on a glass plate upon baking for 5 minutes at 350 degrees C. The results of this test show that the organosilanol is highly reactive in that it reacts completely with the alkyd resin to form a homogeneous, clear product.

*Example 6*

The procedure of Example 5 is repeated, using 375 grams of phenyltrichlorosilane, 375 grams of ethyltrichlorosilane and 750 cc. of butyl acetate. The ratio of the organosilane solution to the water is 1:26; the water is pumped into the system under a pressure of 15 p. s. i.; the temperature at the inlet of the eductor is 3–10° C.; the temperature at the outlet of the eductor is 4–11° C.; and the temperature of the agitated chamber is below 11° C. The by-product of the hydrolysis reaction is dilute hydrochloric acid (50 pounds having an HCl concentration of 1.8 percent—.285 N). The organosilanol solution prepared by this procedure is tested in the same manner as the organosilanol solution of Example 5, using 1300 grams of the alkyd resin instead of 630 grams, and is found to be similarly highly reactive with the alkyd resin so as to produce a clear film.

*Example 7*

The procedure of Example 5 is repeated, using ethyltrichlorosilane (500 grams) mixed with a solvent (500 cc. of butyl acetate). The ratio of the organosilane solution to the water is 1:30; the water enters the system under 20 p. s. i. pressure; the outlet temperature of the eductor is below 10° C.; and the temperature of the agitated chamber is 10° C. The by-product of the reaction is dilute hydrochloric acid, having an HCl concentration of 2.4 percent. The organosilanol solution prepared by this procedure is tested in the same manner as the organosilanol solution of Example 5, and is found to be similarly highly reactive with the alkyd resin so as to produce a clear film.

*Example 8*

The procedure of Example 5 is repeated, except that a column (2½ feet high by ¾ inch in diameter, packed with 3/16 inch glass helices) having a contact time of 14 seconds is substituted in place of the agitated chamber. The ratio of the organosilane solution to the water is 1:24; the water enters the system under 15 p. s. i. pressure; and the temperature remains below 20° C. at all points in the system. The by-product of the reaction is dilute hydrochloric acid, having an HCl concentration of 2.3 percent. The organosilanol solution prepared by this procedure is tested in the same manner as the organosilanol solution of Example 5, and is found to be reactive with the alkyd resin so as to produce a film having only a slight haze. A clear film without haze is obtained if, in place of the 2½ foot column, a longer column is employed like the mixing column of the apparatus of Figure 2.

*Example 9*

(a) Phenyltrichlorosilane (477 lbs.) is mixed in a surge tank (using the apparatus of Figure II) with a mixed solvent (453 lbs., consisting of 40 percent butyl acetate and 60 percent xylene). The resulting solution is continuously drawn, as a stream, into the mixing column by the action of an aqueous stream passing through the eductor, at a solution feed rate of 60 to 85 pounds per hour for 6¾ hours. The aqueous stream is hydrochloric acid (initially 7.1 percent HCl and finally 20.7 percent HCl) flowing at a rate of 850–1050 pounds per hour, and is chilled by flowing through the heat exchanger before passing through the eductor. The contact of the organosilane-solvent solution with the chilled aqueous stream produces an immediate hydrolysis reaction, which goes to completion in the mixing column. The temperature at the eductor outlet is maintained between 9° C. and 16° C. by regulating the solution feed rate in accordance with the temperature of the aqueous stream. The by-product of the hydrolysis reaction (dilute hydrochloric acid) is recycled, so that the aqueous stream becomes more concentrated as the process continues. The total product (withdrawn from the top of the second separating column during the 6¾ hour run) is a solution (730.5 pounds) having a solids content of 39.0 percent (on a completely condensed basis) and an acid number of 38.8 (on a completely condensed solids basis). The by-product of the hydrolysis reaction (withdrawn from the bottom of the separating columns) is hydrochloric acid having 20.7 percent HCl concentration.

A large sample (263 pounds) of the product solution is tested in the same manner as the organosilanol solution of Example 5, using 103 pounds of the same alkyd resin instead of 630 grams, and is found to be similarly highly reactive with the alkyd resin so as to produce a clear film.

(b) Solutions of reactive organosilanols produced by the foregoing procedure are valuable for reaction with other resins to form siliconated co-condensed products. Such compositions having the following properties have been found to be excellent for such a use:

| | |
|---|---|
| Solids _____percent__ | 40 |
| Solvent: | |
|     Xylene _____do____ | 60 |
|     Butyl acetate_____do____ | 40 |
| Viscosity _____cp__ | 5–25 |
| Acid number_____ | [1] 40–70 |
| Molecular weight by the cryoscopic method in benzene _____ | 2300 |
| (OH) _____percent__ | 5.73 |
| Silicon _____do____ | 21 |
| (H) value (OH/Si)_____ | 0.46 |

[1] Reproducible acid numbers are obtained by titration of a sample of the organosilanol solution (containing 2 grams of solids) diluted with 50 ml. of xylene.

(c) The compositions described in (b) may be used to siliconate products having free alcoholic OH groups. Condensation may be effected by refluxing the resin to be siliconated in solution with the reactive organosilanol. As an example of such a reaction, to produce a baking type of vehicle, 250 grams of an organosilanol solution described in (b) together with 500 grams of a "short oil" coconut-modified alkyd resin (60% solids in xylene, containing a 35% excess of alcoholic OH groups over and above the number of esterified alcoholic OH groups) are placed in a flask equipped with a Dean-Stark trap fitted with a stopcock and reflux condenser. The butyl acetate (60 grams) is then removed by distillation into the trap. Excess xylene (about 25 grams) is removed in the same manner and reflux is continued until a clear film is obtained. Testing for a clear film is accomplished by withdrawing several drops of resin solution, placing them on a glass plate and heating at 400° F. for ten minutes. Originally the test spot is opaque. Subsequent samples gradually become less milky, and finally clarity is achieved. At this point refluxing is continued in order to achieve higher viscosity. If reflux is carried on at a higher solids content the attainment of film clarity and viscosity may be accelerated. If it is desirable to retain low viscosity, more solvent may be added for the refluxing period. Finally, the solution is filtered if necessary and the solids content adjusted to 60%. A suitable rapid solids determination is made by heating 1 gram of the resin solution for 30 minutes at 400° F. in an aluminum foil cup.

In contrast to the highly reactive organosilanols described in (b), having a relatively high (OH) content, commercial "silicone" compositions heretofore sold for blending or reaction with other resins have very low (OH) contents. For example, one such phenyl "silicone" has been found to have a molecular weight of 1800, an (OH) content of 0.55%, a silicon content of 21% and an (H) value of only 0.04. Such a material will not react with alkyds and other polar (OH) containing resins. Other commercial silicone resins bear evidence of having been caustic treated because of their lack of (OH) content, complete inactivity and poor compatibility with polar substances. A phenylsilanol made by the method of this invention, originally having an (H) value of about 0.50 and a molecular weight of about 1300, when treated with dilute alcoholic KOH first goes into solution, and then precipitates out as a fine powder which has a molecular weight of about 1000, a zero hydroxyl content and altered solubility characteristics, and which also is completely unreactive toward and highly incompatible with alkyd resins. It is for this reason that the organosilanol solutions resulting from the method of this invention must not be exposed to alkali before reaction with (OH)-containing substances.

*Example 10*

(a) The procedure of Example 9 is repeated using ethyltrichlorosilane (250.5 pounds), phenyltrichlorosilane (250.5 pounds) and a mixed solvent (433¼ pounds, consisting of 40 percent butyl acetate and 60 percent xylene) at a feed rate of 50 to 75 pounds of organosilane solution per hour for a total run of 7¾ hours. The aqueous stream is hydrochloric acid (initially 3.6 percent HCl and finally 19.8 percent HCl) flowing at a rate of 2400–2500 pounds per hour. The temperature at the eductor outlet is maintained between 16 and 20° C. The product of the reaction is 658.1 pounds of a solution having a solids content of 37.3 percent.

A large sample (636 pounds) of the product solution is tested in the same manner as the organosilanol solution of Example 5, except that the alkyd resin solution is prepared as follows: Alkali refined soya oil (1130 pounds), technical pentaerythritol (225 pounds), and a 5 percent solution of calcium naphthenate (4.5 pounds) are heated using the apparatus described in Example 5 for one hour at a temperature of 235° C. The solution is then cooled and phthalic anhydride (434 pounds) and maleic anhydride (9 pounds) are added. The resulting mixture is heated for six hours at a temperature of 235° C. and then is cooled. "Varolene" (mineral spirits) is added to 237 pounds of the resulting resin to dilute the resin to a 70 percent solids concentration. The acid number of the resulting solution is 4, the color 5 (Gardner-Holdt) and the viscosity $Z_1$ (Gardner-Holdt). This product is found to be similarly highly reactive with the alkyd resin.

(b) Solutions of reactive organosilanols produced by the foregoing procedure are valuable for reaction with other resins to form siliconated co-condensed products. Such compositions having the following properties are especially compatible with other resins and have greater solubility in low solvency solvents such as mineral spirits; these compositions impart more flexibility than the compositions described in Example 9(b) but are not as heat resistant:

| | |
|---|---|
| Solids _____ percent__ | 37 |
| Solvent: | |
|     Xylene _____ do____ | 60 |
|     Butyl acetate _____ do____ | 40 |
| Viscosity _____ cps__ | 5–25 |
| Acid number _____ | 40–70 |
| Molecular weight by the cryoscopic method in benzene _____ | 2510 |
| (OH) _____ percent__ | 5.58 |
| Silicon _____ do____ | 21 |
| (H) value (OH/Si) _____ | 0.33 |

(c) The compositions described in (b) may be used to siliconate various resins. Condensation may be effected by refluxing the resin to be siliconated in solution with the reactive organosilanol. As an example of such a reaction, to product an air-drying vehicle, 167.5 grams of an organosilanol solution described in (b) together with 125 grams of mineral spirits and 500 grams of a "long oil" soya-modified alkyd resin (70% solids in mineral spirits) are refluxed in a flask equipped with a Dean-Stark trap fitted with a stopcock and reflux condenser. The butyl acetate and xylene (105.5 grams) are removed through the stopcock, and reflux is continued until a clear film is obtained. Testing for a clear film is accomplished by withdrawing several drops of resin solution, placing them on a glass plate and heating at 300° F. for 10 minutes. Refluxing is continued until the test film is no longer milky. Higher viscosity may be achieved by further reflux at the same or somewhat higher solids concentration, if necessary. Conversely, the solids content may be lowered in order to achieve film clarity without overbodying. Finally, the solution is filtered if necessary and the solids content adjusted to 60%.

Example 11

The procedure of Example 9 is repeated, using phenyltrichlorosilane (561 pounds) and a mixed solvent (472 pounds, consisting of 40 percent butyl acetate and 60 percent xylene) at a feed rate of 80 to 110 pounds of organosilane solution per hour for a total run of 5⅔ hours. The aqueous stream is hydrochloric acid (initially 19.2 percent HCl and finally 33.1 percent HCl) flowing at a rate of 1650 to 1750 pounds per hour. The temperature at the eductor outlet is maintained between 15 and 20° C. The product of the reaction is 700 pounds of a solution having a solids content of 45.25 percent whose acid number is 42.9. The phenylsilanol is found to have a molecular weight of 1300 by the cryoscopic method in benzene, an (OH) content of 1.3%, and a silicon content of 21%. The (H) value (OH/Si) is 0.11.

A large sample (672 pounds) of the product solution is tested by mixing it with a resin solution prepared as follows: Polymerized rosin (268 pounds), pentaerythritol (31 pounds) and calcium acetate (1.35 pounds) are heated using the apparatus described in Example 5, at a temperature of 275° C. until the acid number is between 10 and 20. Xylene is added to the resulting resin to dilute the resin to a 50 percent solids concentration. The two solutions are found to be completely compatible. This test shows that the product has a very low molecular weight, because it has been found that such a product must have a very low molecular weight in order to pass this test. The resulting mixed resin, however, is found to be brittle, probably because of the low hydroxyl content of this phenylsilanol.

Example 12

The procedure of Example 9 is repeated, using phenyltrichlorosilane (524 pounds) and a mixed solvent (480 pounds, consisting of 40 percent butyl acetate and 60 percent xylene) at a feed rate of 80 to 100 pounds of organosilane solution per hour (average 91.1 pounds per hour) for a total run of 5¾ hours. The aqueous stream is hydrochloric acid (initially 5.15 percent HCl and finally 23.1 percent HCl) flowing at a rate of 2100 pounds per hour. The temperature at the eductor outlet is maintained at 20° C. The product of the reaction is 790 pounds of a solution having a solids content of 41.0 percent. The phenylsilanol is found to have a molecular weight of 1720 by the cryoscopic method in benzene, an (OH) content of 4.62%, and a silicon content of 21%.

A large sample (500 pounds) of the product solution is tested in the same manner as the organosilanol solution of Example 5, using 205 pounds of the same alkyd resin instead of 630 grams, and is found to be similarly highly reactive with the alkyd resin so as to produce a clear film.

Example 13

The procedure of Example 9 is repeated, using phenyltrichlorosilane (490 pounds) and a mixed solvent (469 pounds, consisting of 40 percent butyl acetate and 60 percent xylene) at a feed rate of 75 to 100 pounds of organosilane solution per hour (average 81 pounds per hour) for a total run of 6¼ hours. The aqueous stream is hydrochloric acid (initially 4.9 percent HCl and finally 21.6 percent HCl) flowing at a rate of 1900 to 2000 pounds per hour. The temperature at the eductor outlet is maintained at 15° C. The product of the reaction is 732 pounds of a solution having a solids content of 38.6 percent. The phenylsilanol is found to have a molecular weight of 1880 by the cryoscopic method in benzene, an (OH) content of 6.3% and a silicon content of 21%. The (H) value (OH/Si) is 0.49.

A large sample (505½ pounds) of the product solution is tested in the same manner as the organosilanol solution of Example 5, using 207 pounds of the same alkyd resin instead of 630 grams, and is found to be similarly highly reactive with the alkyd resin so as to produce a clear film.

Example 14

(a) A mixture of ethyltrichlorosilane (105 grams) and phenyltrichlorosilane (105 grams) is dissolved in xylene (200 ml.). The solution is dropped rapidly into a mixture of butyl acetate (200 ml.) and water (165 ml.) at a temperature of 6–10° C. The resulting mixture is stirred for one hour. Hydrochloric acid fumes are given off in copious quantities. All hydrochloric acid evolution ceases after 55 minutes. On standing, the reaction mixture separates into two layers. The upper layer is separated and found to consist of 460 ml. of organosilanol solution. This organosilanol solution is tested in the same manner as the solution of Example 5, using 195 grams of the same alkyd resin instead of 630 grams, and is found to be similarly highly reactive with the alkyd resin so as to produce a clear film.

(b) The procedure of (a) is repeated, except that the mixture of solvent and organosilane is run into the hydrolyzing medium more slowly (over a 15 minute period). The product is washed thoroughly with water to remove residual dissolved hydrochloric acid. One-half of the organosilanol product is tested in the same manner as the solution of Example 5, except that the reflux time is 10 hours instead of 2 hours, using 100 grams of the same alkyd resin instead of 630 grams, and is found to be similarly highly reactive with the alkyd resin so as to produce a clear film.

As a control, to illustrate the result of a concentrated hydrochloric acid hydrolysis using no solvent, raw phenyltrichlorosilane is dropped rapidly into concentrated hydrochloric acid (37%). Phenylsilanol powder separates from the solution. The powder is soluble in benzene and caustic. It can be reacted with an alkyd resin, but the resistance of the resulting product to heat and weathering is inferior to that of the silicone-modified alkyd resins obtained in the practice of the present invention. Ethylsilanol powder is made in a similar manner, except that the concentrated hydrochloric acid is modified: Raw ethyltrichlorosilane (300 grams) is added dropwise to concentrated (37%) hydrochloric acid (1000 grams) mixed with denatured ethanol (20 grams) at a temperature of 30° C. After a few minutes a precipitate forms, which is filtered and washed. The precipitate is ethylsilanol powder having a molecular weight of 4560 by the cryoscopic method in benzene and an (OH) content of 3.60%.

Instead of the foregoing described powders, an organosilanol solution can be produced by mixing carbon tetrachloride with the concentrated hydrochloric acid and dissolving the organosilanes in butyl actate before the hydrolysis: A solution of ethyltrichlorosilane (105 grams) and phenyltrichlorosilane (105 grams) in butyl acetate (200 ml.) is poured into a mixture of carbon tetrachloride (200 ml.) and concentrated (37%) hydrochloric acid (115 ml.). The temperature is maintained at 0 to 10° C. After 30-40 minutes, the mixture is agitated without cooling until the temperature rises to +5° C. The resulting organosilanol solution is tested in the same manner as the solution of Example 5, except that the reflux time is 18 hours instead of 2 hours, using 195 grams of the same alkyd resin instead of 630 grams, and is found to be similarly highly reactive with the alkyd resin so as to produce a clear film.

Having described the invention, I claim:

1. A method of producing highly reactive organosilanols that comprises hydrolyzing, under acidic conditions, a silane composition consisting essentially of trifunctional organosilane, said silane composition being in solution in a solvent medium that forms a two-phase system with the water used for hydrolysis and comprises a substance whose molecule consists of hydrogen atoms, at least five carbon atoms and from one to two oxygen atoms, the carbon and hydrogen atoms being contained in two alkyl groups and a carbonyl group, and at least one of the alkyl groups being connected directly to the carbonyl group, thereby to obtain a solution, in said solvent medium, of an acidic, low molecular weight product having a high hydroxyl content wherein the molecular weight is below 5000 and the hydroxyl content expressed as the hydroxyl/silicon ratio (H), representing the average number of hydroxyl groups per silicon atom, is from 0.10 to 1.05.

2. A method of producing highly reactive organosilanols as claimed in claim 1 wherein the substance is an ester.

3. A method of producing highly reactive organosilanols as claimed in claim 1 wherein the substance is butyl acetate.

4. A method of producing highly reactive organosilanols as claimed in claim 3 wherein the silane composition comprises an organotrichlorosilane.

5. A method of producing highly reactive organosilanols as claimed in claim 1 wherein the silane composition comprises an organotrichlorosilane.

6. A method of producing highly reactive organosilanols as claimed in claim 1 wherein the silane composition comprises at least 5% by weight of phenyl trifunctional silanes.

7. A highly reactive organosilanol produced by the method of claim 6.

8. A highly reactive organosilanol produced by the method of claim 6 wherein the silane composition consists essentially of organotrichlorosilanes.

References Cited in the file of this patent

UNITED STATES PATENTS

| | | |
|---|---|---|
| 2,390,378 | Marsden | Dec. 4, 1945 |
| 2,398,672 | Sauer | Apr. 16, 1946 |
| 2,646,441 | Duane | July 21, 1953 |
| 2,679,495 | Bunnell | May 25, 1954 |

FOREIGN PATENTS

| | | |
|---|---|---|
| 967,704 | France | Apr. 5, 1950 |
| 864,152 | Germany | Jan. 22, 1953 |